United States Patent [19]

Kraus

[11] Patent Number: 4,484,487
[45] Date of Patent: Nov. 27, 1984

[54] HYDRAULICALLY CONTROLLED INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 455,121

[22] Filed: Jan. 3, 1983

[51] Int. Cl.³ ............... F16H 15/08; F16H 15/00; F16H 15/16

[52] U.S. Cl. ............... 74/200; 74/201; 74/199; 74/193; 74/190

[58] Field of Search ............ 74/200, 201, 199, 190, 74/193, 190.5

[56] References Cited

U.S. PATENT DOCUMENTS

| | | | |
|---|---|---|---|
| 3,087,348 | 4/1963 | Kraus | 74/200 |
| 3,163,050 | 12/1964 | Kraus | 74/200 |
| 3,163,051 | 12/1964 | Kraus | 74/200 |
| 3,486,391 | 12/1969 | Kraus | 74/200 |
| 3,760,646 | 9/1973 | Kraus | 74/200 |
| 3,810,398 | 5/1974 | Kraus | 74/200 |
| 4,086,820 | 5/1978 | Kraus et al. | 74/200 |
| 4,126,052 | 11/1978 | Jackman | 74/200 |
| 4,272,999 | 6/1981 | Perry | 74/200 |
| 4,275,610 | 6/1981 | Kraus | 74/200 |
| 4,281,559 | 8/1981 | Sharpe | 74/200 |

Primary Examiner—Lawrence J. Staab
Assistant Examiner—Michael David Bednarek
Attorney, Agent, or Firm—Klaus J. Bach

[57] ABSTRACT

An infinitely variable traction roller transmission with traction rollers arranged between, and in engagement with, opposite toric discs for the transmission of motion therebetween includes traction roller support trunnions pivotally mounted in a transmission housing which has partially cylindrical housing cavities formed behind the trunnions, the trunnions having support cavities receiving pressurized fluid for floatingly supporting the trunnions on the cylindrical housing cavities to permit friction free pivoting and axial movement of the trunnions for adjustment of the transmission ratio.

13 Claims, 3 Drawing Figures

HYDRAULICALLY CONTROLLED INFINITELY VARIABLE TRACTION ROLLER TRANSMISSION

BACKGROUND OF THE INVENTION

The invention relates to an infinitely variable traction roller transmission in which power is transmitted through traction rollers pivotally supported in a housing between toric input and output discs.

In such transmissions, the traction rollers are mounted on support structures which, when pivoted, cause engagement of the traction rollers with the toric discs in circles of varying diameters depending on the desired transmission ratio. The pivotal traction roller support structures are so mounted that they can be moved axially for initiating a change in the transmission ratio. This is accomplished for example by flexible tension sheets as shown in U.S. Pat. No. 4,086,820 which issued May 2, 1978 to Charles E. Kraus.

However, the forces applied to the traction rollers and, through the traction roller support structure, to the tension sheets are substantial and, consequently require support structure of great strength together with adequate pivot bearings therefor. Also, the transmission is not always free of vibrations and these vibrations are transmitted from the traction rollers to the traction roller support structures and their bearings and finally to the transmission housing.

SUMMARY OF THE INVENTION

In order to firmly support the traction rollers and the traction roller support structures in a simple and inexpensive manner and essentially free from vibrations, an infinitely variable traction roller transmission with traction rollers arranged between, and in engagement with, opposite toric discs includes traction roller support trunnions with pressurized fluid receiving cavities formed thereon opposite the traction rollers and adjacent the walls of a partially cylindrical support cavity formed in the housing and having centers of curvature coinciding with the pivot axis of the respective support trunnion. Pressurized fluid supplied to the support cavities directly supports the traction roller support trunnions without transmitting vibrations from the traction rollers to the housing. Being evenly supported the trunnions are not subject to bending stresses and, floating on the pressurized fluid, they are easily pivotable even when large torques are transmitted through the transmission and large contact forces are applied to the contact areas between the traction rollers and the toric discs.

SHORT DESCRIPTION OF THE DRAWINGS

DESCRIPTION OF THE PREFERRED EMBODIMENT

Figure 1:
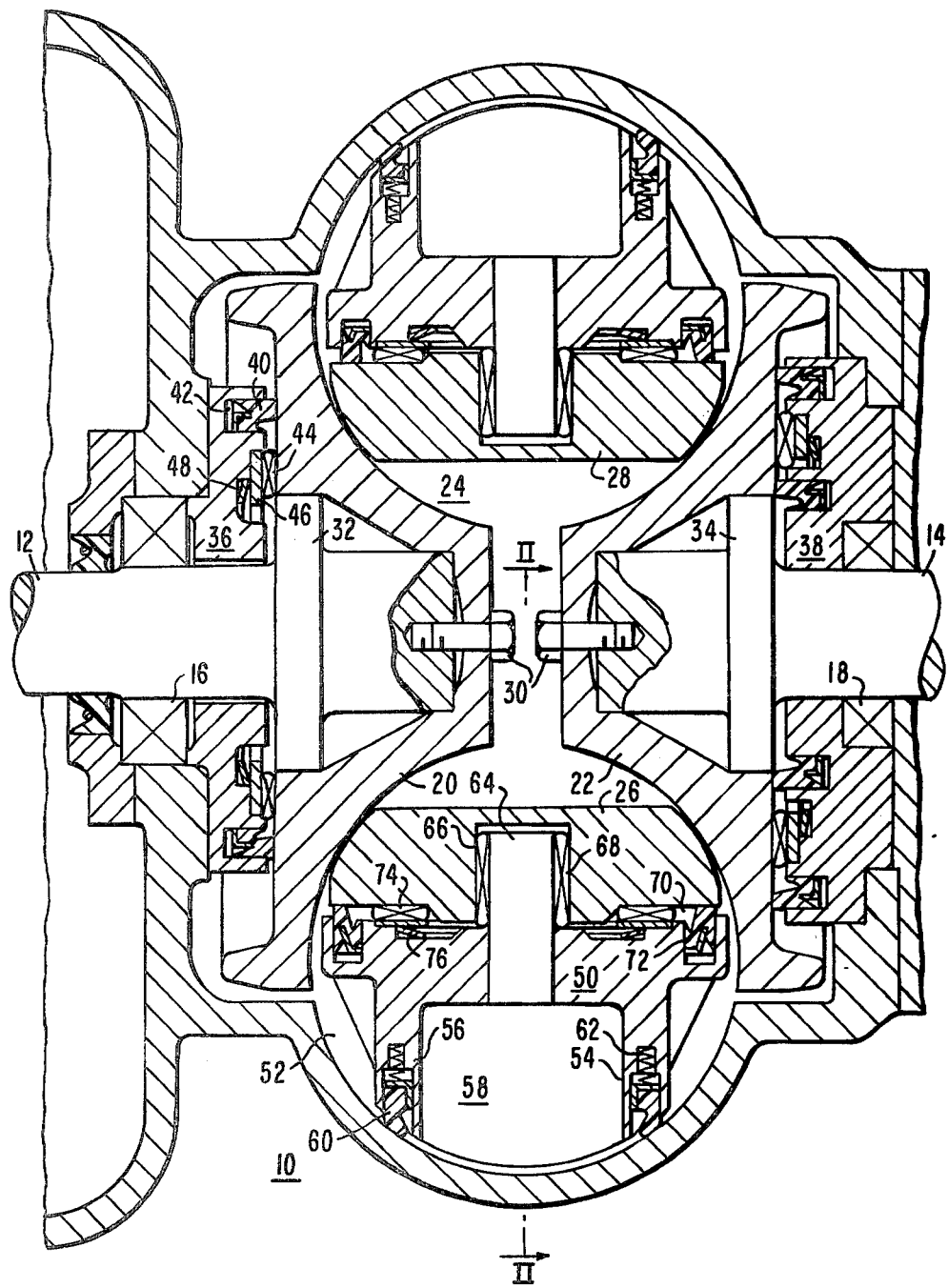
FIG. 1 is an axial cross-sectional view of the traction roller transmission.

A traction roller transmission as shown in FIG. 1 consists of a housing 10 having coaxial input and output shafts 12 and 14 rotatably supported therein by bearings 16 and 18. Associated with the input and output shafts 12 and 14 are toric traction discs 20 and 22 so arranged opposite each other that a toric cavity 24 of circular axial cross-section is defined therebetween. Within the toric cavity 24 traction rollers 26, 28 are rotatably supported and are in engagement with the toric traction discs 20 and 22 for the transmission of motion between the discs 20, 22.

The toric traction discs 20 and 22 are mounted on the ends of shafts 12 and 14 by screws 30 and they are seated on flanges 32 and 34. Axial support is provided for the traction discs 20 and 22 by axial thrust bearing structures 36 and 38. Each axial thrust bearing structure includes a hydrostatic bearing comprising the area within a limited leakage seal ring 40 which is axially slidably disposed within an annular seal ring cavity 42 and a mechanical axial thrust bearing 44 which provides for minimum bearing support to avoid damage during start-up operation when insufficiently pressurized fluid is supplied to the hydrostatic axial thrust bearing. The mechanical bearing 44 abuts an axially movable bearing ring 46 with a belleville spring 48 disposed behind it so as to provide always a degree of minimum engagement between the toric discs 20 and 22 and the traction rollers 26 and 28.

The traction rollers 26 and 28 are rotatably supported on a pivot trunnion structure 50 which permits pivoting of the traction rollers about axes normal to a plane including the input and output shaft axis to provide for engagement of the traction rollers 26 and 28 with the surface of the toric discs 20 and 22 at circles of different diameters for the adjustment of various power transmission ratios between the input and output shafts 12 and 14.

For the support of the trunnion structures 50, the housing 10 has a semicylindrical cavity 52 into which a hydrostatic trunnion back-up structure 54 extends. The trunnion back-up structure 54 has walls 56 surrounding a trunnion cavity 58 adapted to be pressurized by hydraulic fluid for supporting the trunnion. The cavity walls 56 have seal strips 60 supported therein adjacent the semicylindrical walls of the housing 10 defining the housing cavity 52. A number of springs 62 are disposed behind the seal strips 60 so as to provide for sealing engagement of the seal strips 60 with the wall of the housing cavity 52.

The traction roller 26 is supported on the trunnion structure 50 by a shaft 64 which projects from the trunnion structure 50 into a central bore 66 in the roller 26. Roller bearings 68 are provided for radial support of the traction roller 26. During operation, the traction roller 26 is axially supported by a hydrostatic bearing formed by the bearing cavity 70 surrounded by a seal ring 72. A back-up roller bearing 74 is provided for supporting the traction roller when insufficiently pressurized fluid is supplied to the bearing cavity 70, as for example, during start-up. The back-up bearing 74 is supported axially movably by a belleville spring 76 in order to keep the traction roller 26 in engagement with the toric discs 20 and 22 at all times.

Figure 2:
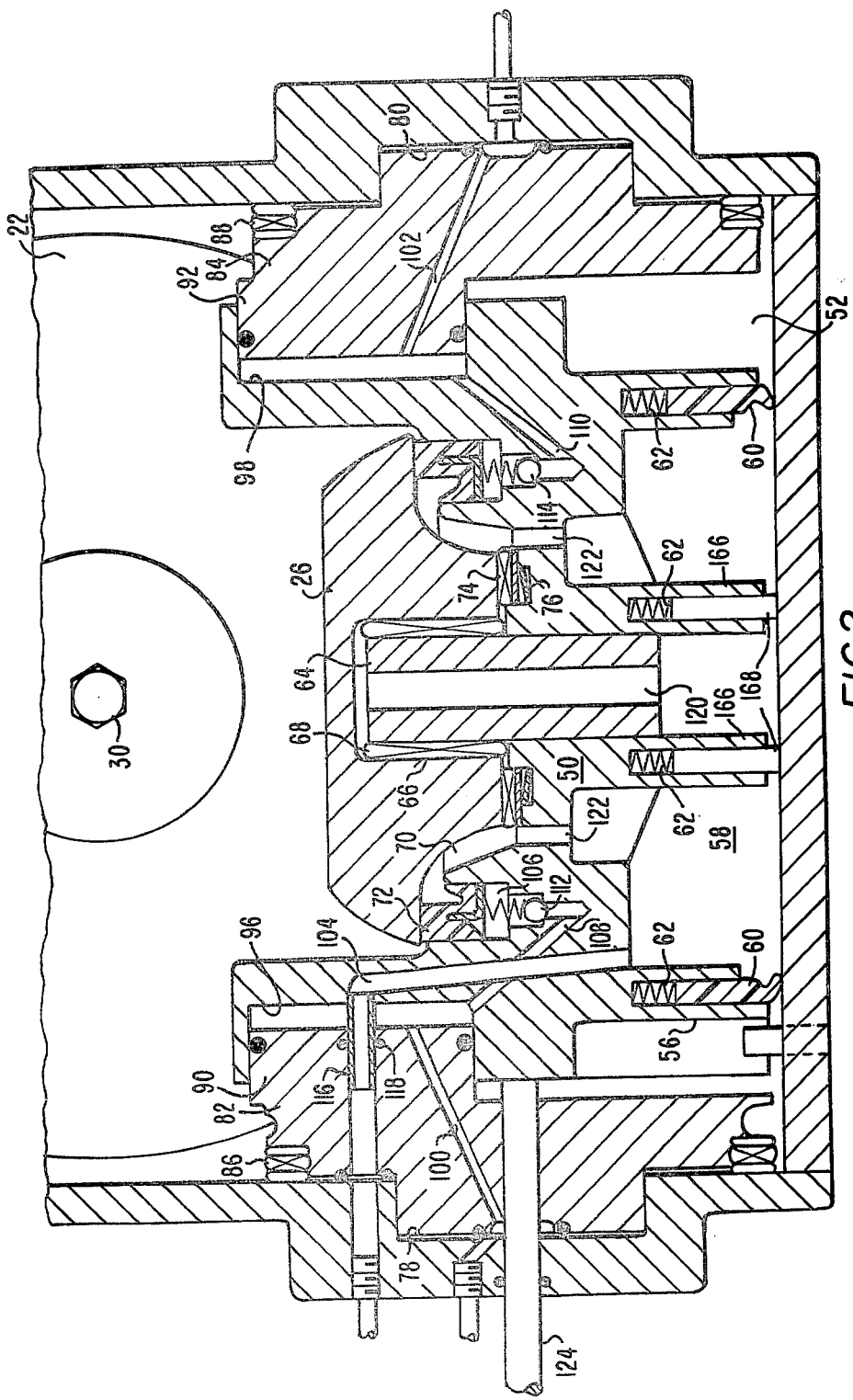
FIG. 2 is a cross-sectional view along lines II—II of FIG. 1.

The trunnion structure 50 is pivotally supported in the housing 10 as best shown in FIG. 2. At the axial opposite ends of the trunnion structure 50, the housing 10 has circular cavities 78 and 80 which pivotally receive trunnion support members 82 and 84 axially supported by axial thrust bearings 86 and 88, the axis of the cavities 78 and 80 being essentially tangent to the center circle of the toric cavity defined by the toric discs and being the centerline of curvature of the semi-cylindrical housing cavity 52.

The trunnion support members 82 and 84 have integral control pistons 90 and 92 which project toward each other and are arranged along an axis which extends essentially through the center of the circle of contacts on the surface of the traction roller 26 with the toric discs 20 and 22. The traction roller support trunnion 50 has cylindrical cavities 96 and 98 formed therein which cavities receive the control pistons 90 and 92 respectively. Means, 100, 102 are provided for supplying pressurized fluid to the cylinders 96 and 92 for axially moving the roller support trunnion 50 and, together therewith, the traction roller 26 relative to the toric discs to initiate a change of the transmission ratio.

As shown in FIG. 2, the seal ring 72 is forced into engagement with the traction roller 26 by pressurized fluid supplied to the seal ring cavity 106 through a bore 108 providing communication of the seal ring cavity 106 with the cylindrical cavity 96 and through a bore 110 providing communication of the seal ring cavity 106 with the cylindrical cavity 98 at the opposite sides of the traction roller 26. Check valve 112 and 114 are disposed in the bores 108 and 110 respectively so as to insure pressurization of the seal ring cavity 106 by pressurized fluid from that of the cylindrical cavity 96, 98 which is exposed to the higher pressure control fluid.

A pressurized lubricant passage 104 extends through the center of the control piston 90 and the support trunnion 50 to the trunnion cavity 58 for supplying pressurized lubricant thereto in order to provide hydrostatic support for the traction roller 26 directly by the pressurized lubricant supplied to the support cavity 58. To avoid loss of pressurized lubricant from the passage 104 to the trunnion cavity 96, the passage 104 includes a tube 116 extending into the piston 90 and being slidably sealed therein by a seal ring 118.

The shaft 64 of the traction roller 26 is provided with an axial passage 120 for admitting pressurized lubricant to the roller bore 66 and to the bearing 68. Passages 122 extend through the trunnion 50 for supplying pressurized fluid to the traction roller support cavity 70 of the hydrostatic bearing structure 72 for directly forcing the traction roller 26 into firm engagement with the toric discs 20 and 22 depending on the pressure of the lubricant supplied to the trunnion support cavity 58.

Rotation of the input shaft 12 in one direction causes rotation of the output shaft 14 in the opposite direction at a relative speed which depends on the pivot positions of the traction roller support trunnions 50. For firm engagement of the traction rollers 26 and 28 with the opposite toric discs 20 and 22, the cavities 58 behind the traction rollers 26 and 28 are pressurized so that essentially no bending load is applied to the traction roller support trunnions 50.

A change of the transmission ratio is initiated by moving the traction roller support trunnions 50 axially such that the traction rollers walk to larger circles of contact with one and to smaller circles of contact with the other of the opposite toric discs 20 and 22 thereby pivoting the traction roller support trunnion 50 and changing the transmission ratio. Axial movement and pivoting of the traction roller support trunnion is easily accomplished as the traction rollers and their trunnions are floatingly supported by the lubricant in the cavity 58. Axial movement of the trunnions 50 is obtained by admitting pressurized fluid to one of the cylinder cavities 96, 98 and releasing pressurized fluid from the other.

Lubrication and support fluid is admitted to the trunnion cavities 58 through the passage 104 at a pressure sufficient to support the traction roller 26 and support trunnion 50 to take up the forces necessary to hold them in engagement with the toric discs 20, 22. The forces with which the traction roller need to be held in engagement with the toric discs depend on the torque to be transmitted through the transmission and the fluid pressure providing the contact forces is, accordingly, controlled depending on the torque transmitted through the transmission.

Any torque transmitted through the transmission is transmitted through the traction rollers 26, 28 and generates an axial trunnion force which must be balanced by differential control fluid pressures in the control cylinders 96 and 98. The difference of pressure in the control cylinders 96 and 98 is therefore a measure for the torque transmitted through the transmission and it is a direct measure for the force necessary for engagement of the traction rollers 26, 28 with the toric discs 20, 22 to avoid slippage.

If the low pressure level is controlled to be essentially constant or, to some extent, to be constant dependent on the transmission ratio, that is the pivot position of the trunnion, then the high pressure will adjust itself depending on the torque transmitted through the transmission if for example a transmission ratio control arrangement is used as described in applicant's U.S. Pat. No. 4,434,675. The high pressure then is a measure for the forces necessary for engagement of the traction rollers with the toric discs. This higher control fluid pressure may occur in either one of the control cylinders 96 and 98 depending on the direction in which the torque is transmitted through the transmission that is, depending on the direction of rotation and in which direction power is transmitted. In any case, with the arrangement as described earlier herein, the pressure of the higher pressure control fluid is applied to the seal ring cavity 106 through either bore 108 or bore 110 while the check valve 114 or, respectively, 112 is closed so as to maintain the higher control fluid pressure in the seal ring cavity 106. Consequently, the seal ring 72 is forced toward the traction roller 26 with a force which increases when the torque transmitted through the transmission increases and which reduces leakage from the bearing cavity 70 through the limited leakage seal 72 thereby causing buildup of pressure in the trunnion cavity 58 and in the traction roller bearing cavity 70.

Figure 3:
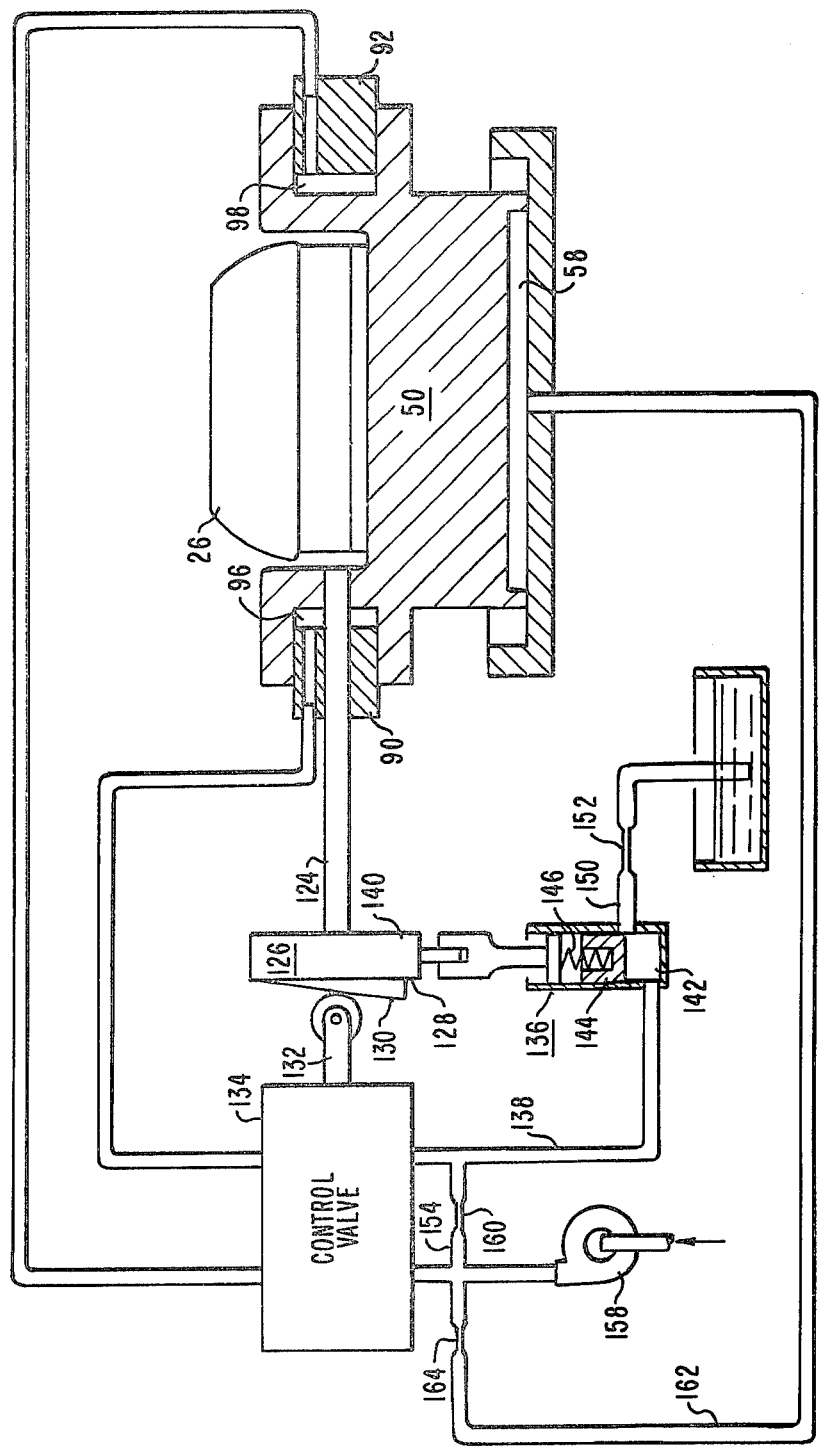
FIG. 3 shows a control schematic for controlling the supply of pressurized fluid to the traction roller support transmission.

A control arrangement for the supply of the control fuid to the control cylinders 96 and 98 is shown schematically in FIG. 3. The pivotal trunnion support member 82 has a control shaft 124 connected thereto so as to rotate with the trunnion and trunnion support member and to move axially with the trunnion 50. At its free end, the shaft 124 carries a cam structure 126 which, at its face 128 has a precess cam 130 abutted by the control stem 132 of a four way control valve 134 adapted to control admission of control fluid to, and release thereof from, the ratio control cylinders 96 and 98 in a manner as described in detail in applicant's application Ser. No. 301,442. However, the minimum traction roller engagement forces depend on the minimum control fluid pressure. The desired minimum forces again depend on the traction roller pivot position. The minimum pressure therefore is controlled by a pivot position sensitive control valve 136 arranged in the pressure release line 138 from the control valve 134 and operated by a circumferential cam 140 on the cam structure 126.

The pivot position sensitive control valve 136 may consist of a cylinder 142 having a piston 144 movably disposed therein, the piston 144 being biased by a spring 146 abutting a cam follower 146 operated by the cam 140. The piston 144 permits release of control fluid into discharge line 150 only when the control fluid pressure is sufficient to open control valve 136 against the force of spring 146 which force depends on the pivot position of the traction roller 26. Preferably, the discharge line 150 is provided with a capillary 152 in order to avoid rapid pressure changes which may result in jerking motions. Also, preferably a by-pass connection 154 is provided between the lubricant supply line 156 from the pump 158 and the discharge line 138 so as to establish minimum pressure in the discharge line 138, the by-pass connection 154 including an orifice permitting only a relatively small flow, substantially smaller than the flow possible through capillary 152.

Pressurized fluid is supplied to the semicylindrical housing cavity 58 through a supply line 162 provided with a flow limiting orifice 164, cavity 58 adjustable by the admission of fluid and the leakage permitted by the hydrostatic bearing seal 72 of the traction roller 26 thereby to control the trunnion and traction roller supporting fluid pressure depending on the torque transmitted through the transmission.

With this arrangement, accurate speed control can be achieved and unnecessary loading of the traction surfaces is avoided. The pressurized lubricant is supplied to all hydrostatic bearings by a single pump. The supply lines to the various bearings however preferably include orifices so as to insure proper distribution of the pressurized lubricant to the various hydrostatic bearings.

The invention however is not limited to the arrangement exactly as described and as shown in the drawings. It would for example be possible to provide a single-piece trunnion structure with control pistons arranged in the pivot axis of the trunnion. Such an arrangement would be simpler than the arrangement shown, although a slight bending force would be generated which might cause precess movement of the trunnion. In relatively low-power transmissions such forces however could be accommodated quite easily.

It may be noted at this point that, with the arrangement as shown in FIG. 2, the axial thrust bearings 86 and 88 for the trunnion support members 82 and 84 are preferably large enough so that the axis of the cylinders 96 and 98 extend through the space surrounded by the bearings 86 and 88 in order to provide for proper loading of the axial thrust bearings 86 and 88.

Further, the pressurized fluid cavity 58 formed between the trunnion 50 and the housing 10 may be circular with curved annular seals 60 to abut the semi-cylindrical wall of housing 10 or it may be rectangular in cross-section with straight first seal strips arranged in the direction of the axis of the trunnion 50 and partially circular second seal strip sections arranged normal to the first seal strip sections. Finally, the pressurized fluid cavity 58 may be sectionalized by separating walls 160 and seal strips 168 may be arranged in the separating walls 166.

I claim:

1. An infinitely variable traction roller transmission comprising a housing; coaxial input and output shafts rotatably supported in said housing; two toric discs supported opposite each other one by said input and the other by said output shaft, said toric discs having opposite toric surfaces defining therebetween a toric cavity of circular cross-section; at least two motion transmitting traction rollers disposed between said toric discs, each being in engagement with said toric discs for the transmission of motion therebetween; a pivotal support structure rotatably supporting said traction rollers and being pivotally supported in said housing so as to permit changing of the ratio of motion transmission between said input and output toric discs, said housing having a partial cylindrical wall section forming a cavity adjacent each of said trunnions, said partial cylindrical wall section having a center of curvature coinciding essentially with the pivot axis of said trunnion, and said trunnion having walls with sealing means in sealing engagement with said partial cylindrical wall section so as to form a support cavity between said trunnion and the cylindrical wall section of said housing; and means for admitting pressurized fluid to said support cavity so as to provide for support of said trunnion on said cylindrical housing wall section.

2. An infinitely variable traction roller transmission as claimed in claim 1, wherein said sealing means are seal strips which are shaped to abut the adjacent partial cylindrical housing wall sections and which are spring-biased into engagement with said housing wall sections.

3. A traction roller transmission as claimed in claim 1, wherein said trunnions have axial piston and cylinder structures arranged at their opposite ends and means are provided for selectively admitting pressurized fluid to said piston and cylinder structures for axially moving said trunnion to initiate a change in the transmission ratio.

4. A traction roller transmission as claimed in claim 3, wherein trunnion support members are arranged in said housing adjacent the axial ends of said trunnions and are supported rotatably about a pivot axis which is essentially a tangent to the center circle of said toric cavity, and said piston and cylinder structures have a centerline which extends through a plane defined by the circle of contact of said traction rollers with said toric discs so as to minimize precess movement generating reaction forces on said trunnion when a torque is transmitted through said transmission.

5. A traction roller as claimed in claim 4, wherein axial thrust bearings are arranged between said trunnion support members and said housing said axial thrust bearings having a radius exceeding the distance between said transmission pivot axis and the centerline of said piston and cylinder structures.

6. A traction roller transmission as claimed in claim 5, wherein said trunnion support members have said pistons extending therefrom into cylinders formed into said trunnions such that said trunnions are axially movably supported by said pistons and said pressurized fluid supply means include passages extending through said support members.

7. A traction roller transmission as claimed in claim 1, wherein each traction roller includes a hydrostatic axial thrust bearing structure defining a hydrostatic cavity which is in communication with said trunnion support cavity to receive pressurized fluid therefrom.

8. A traction roller transmission as claimed in claim 6, wherein each traction roller includes a hydrostatic axial thrust bearing structure having a hydrostatic bearing seal ring axially movably disposed in an annular seal ring cavity, said annular seal ring cavity being in communication with at least one of the cylinders of said piston and cylinder structures.

9. A traction roller transmission as claimed in claim 8, wherein communication passages are provided between said seal ring cavity and both trunnion piston and cylinder structures and check valves are arranged in said communication passages so as to supply pressurized fluid to said seal ring cavity from the trunnion cylinder carrying fluid of a pressure higher than that in the other, thereby to control the fluid pressure in said support cavity and in said hydrostatic traction roller bearing cavity depending on the pressure of said higher pressure fluid.

10. A traction roller transmission as claimed in claim 1, wherein said support cavity is sectionalized so as to provide a number of support cavity chambers.

11. A traction roller transmission as claimed in claim 1, wherein a pressurized fluid source is provided and a control valve is so associated with at least one of said trunnions as to cause selective admission of control fluid to said trunnion piston and cylinder structures for pivoting said trunnion to a desired transmission ratio pivot position and wherein means are provided for controlling the pressure of the fluid discharged from said piston and cylinder structures depending on the pivot position of said transmission.

12. A traction roller transmission as claimed in claim 11, wherein said means for controlling the discharge pressure of said control fluid is a spring biased pressure control valve having biasing means associated with said trunnions and adapted to set the spring force of said spring biased control valve depending on the trunnion pivot position.

13. A traction roller as claimed in claim 12, wherein said biasing means is a cam follower abutting a cam structure mounted for rotation with said trunnion.

* * * * *